United States Patent [19]
Sayyadi et al.

[11] Patent Number: 5,320,002
[45] Date of Patent: Jun. 14, 1994

[54] MACHINE FOR STRIPPING OUTER JACKET FROM MULTI-CONDUCTOR CABLES

[75] Inventors: Babak Sayyadi, Seattle; Howard J. Van Laeken, Woodinville, both of Wash.

[73] Assignee: The Boeing Company, Seattle, Wash.

[21] Appl. No.: 955,281

[22] Filed: Oct. 1, 1992

[51] Int. Cl.$^5$ .............................................. H02G 1/12
[52] U.S. Cl. .......................................... 81/9.51; 81/9.42
[58] Field of Search ........................ 81/9.51, 9.41, 9.42

[56] References Cited

U.S. PATENT DOCUMENTS

| | | | |
|---|---|---|---|
| 1,351,186 | 8/1920 | Nelson . | |
| 1,595,799 | 8/1926 | Massingham . | |
| 2,768,276 | 10/1956 | Arntzen | 219/29 |
| 2,871,740 | 2/1959 | Andren | 81/9.51 |
| 2,884,825 | 5/1959 | Eubanks | 81/9.51 |
| 3,080,469 | 3/1963 | Benoit | 219/29 |
| 3,139,778 | 7/1964 | Bielinski et al. | 81/9.51 |
| 3,176,550 | 4/1965 | Marcotte | 81/9.51 |
| 3,199,383 | 8/1965 | Gudmestad | 81/9.51 |
| 3,315,300 | 4/1967 | Ziolko | 17/12 |
| 3,343,433 | 9/1967 | Rozmus | 81/9.5 |
| 3,706,241 | 12/1972 | Balmer et al. | 81/9.51 |
| 3,706,242 | 12/1972 | Wright et al. | 81/9.51 |
| 3,765,276 | 10/1973 | Pollitt | 81/9.51 |
| 3,816,915 | 6/1974 | Bieganski | 30/90.1 |
| 3,881,374 | 5/1975 | Gudmestad | 81/9.51 |
| 3,892,145 | 7/1975 | Richie | 81/9.51 |
| 3,927,590 | 12/1975 | Gudmestad et al. | 83/151 |
| 3,942,221 | 3/1976 | Sipusic et al. | 17/42 |
| 3,960,040 | 6/1976 | Gudmestad et al. | 83/18 |
| 4,104,012 | 8/1978 | Ferrante | 425/299 |
| 4,261,231 | 4/1981 | Bleakley | 81/9.51 |
| 4,327,609 | 5/1982 | Resch | 81/9.51 |
| 4,364,289 | 12/1982 | Sorensen | 81/9.51 |
| 4,601,093 | 7/1986 | Cope | 29/564.4 |
| 4,614,135 | 9/1986 | Ito et al. | 81/9.51 |
| 4,699,027 | 10/1987 | Guyette et al. | 81/9.51 |
| 4,745,828 | 5/1988 | Stepan | 81/9.51 |
| 4,838,129 | 6/1989 | Cope | 81/9.5 |
| 4,869,135 | 9/1989 | Hoffa | 81/9.51 |
| 4,932,291 | 6/1990 | Potesta | 81/9.44 |
| 4,942,789 | 7/1990 | Hoffa et al. | 81/9.51 |
| 4,951,530 | 8/1990 | Cross | 81/9.51 |
| 4,993,287 | 2/1991 | Carpenter et al. | 81/9.51 |
| 4,999,910 | 3/1991 | Cross | 29/825 |
| 5,033,335 | 7/1991 | Yatsu et al. | 81/9.4 |
| 5,072,632 | 12/1991 | Sayyadi | 81/9.51 |

FOREIGN PATENT DOCUMENTS 2478890 9/1981 France .

*Primary Examiner*—D. S. Meislin
*Attorney, Agent, or Firm*—Bruce A. Kaser; Joan H. Pauly

[57] ABSTRACT

An automated wire stripper has a forward wire-gripping assembly, a rearward insulation-pulling assembly, and a rotatable knife hub assembly positioned intermediate of the forward and rearward assemblies. The knife hub assembly includes a pair of thermal knife elements which are spring-biased to normally close upon the end of a wire. Pneumatic actuators open the knife elements against the bias of the springs. The rearward assembly is operable to clamp and pull a section of outer jacket or insulation covering from the wire after the knife hub has cut around the its circumference of the jacket.

17 Claims, 13 Drawing Sheets

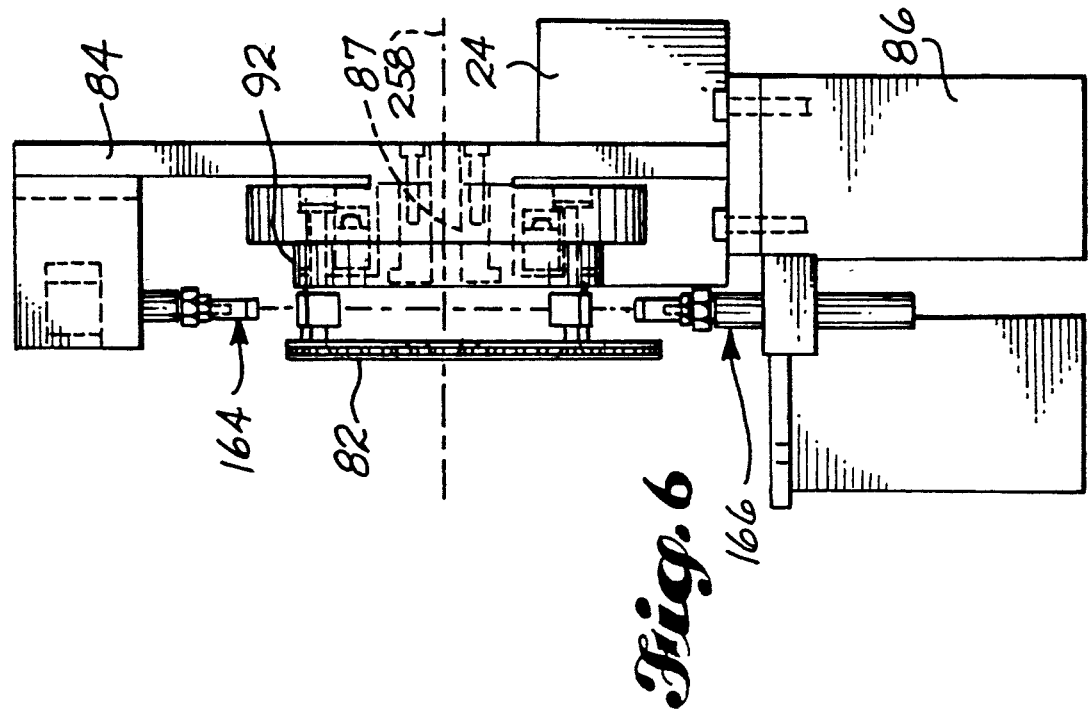
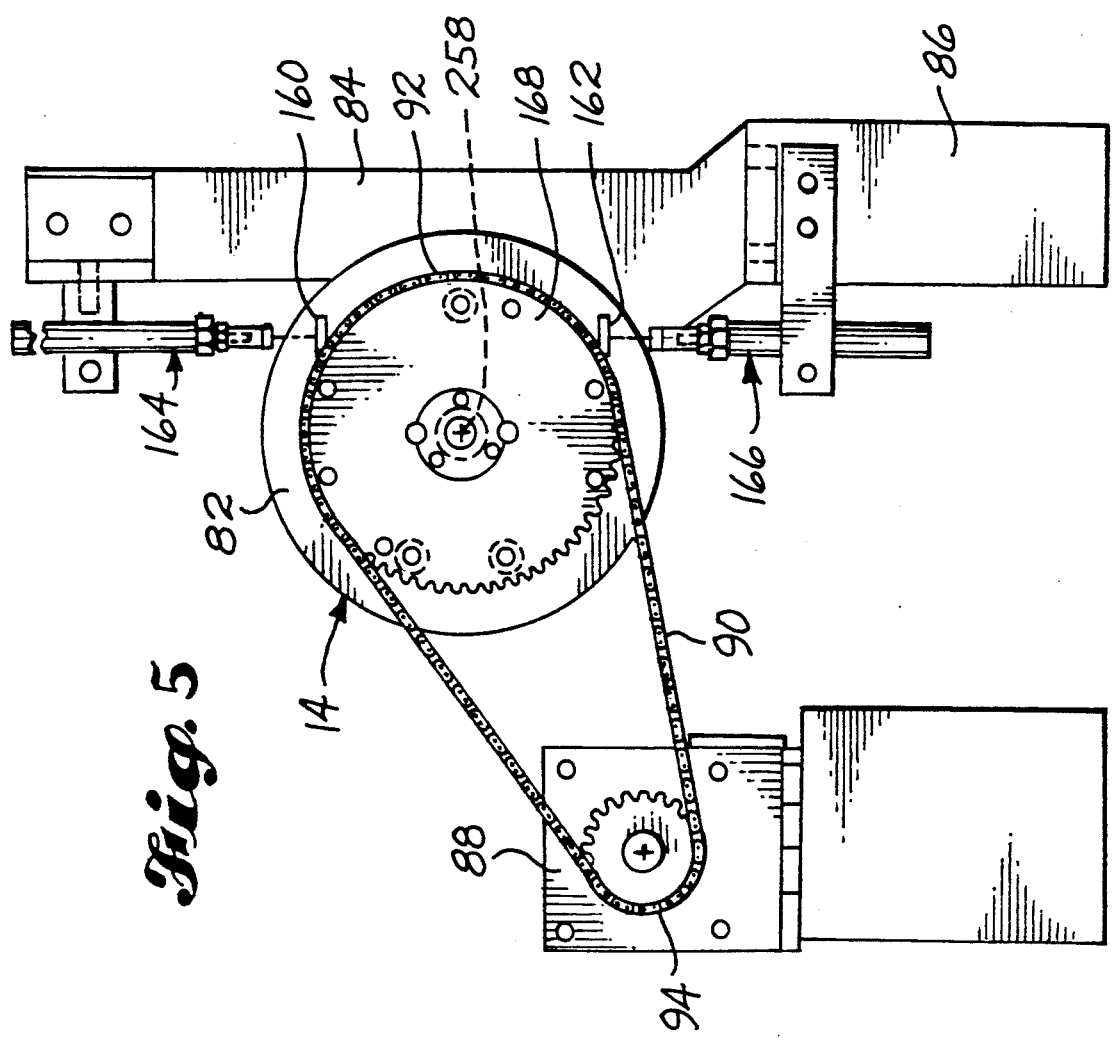

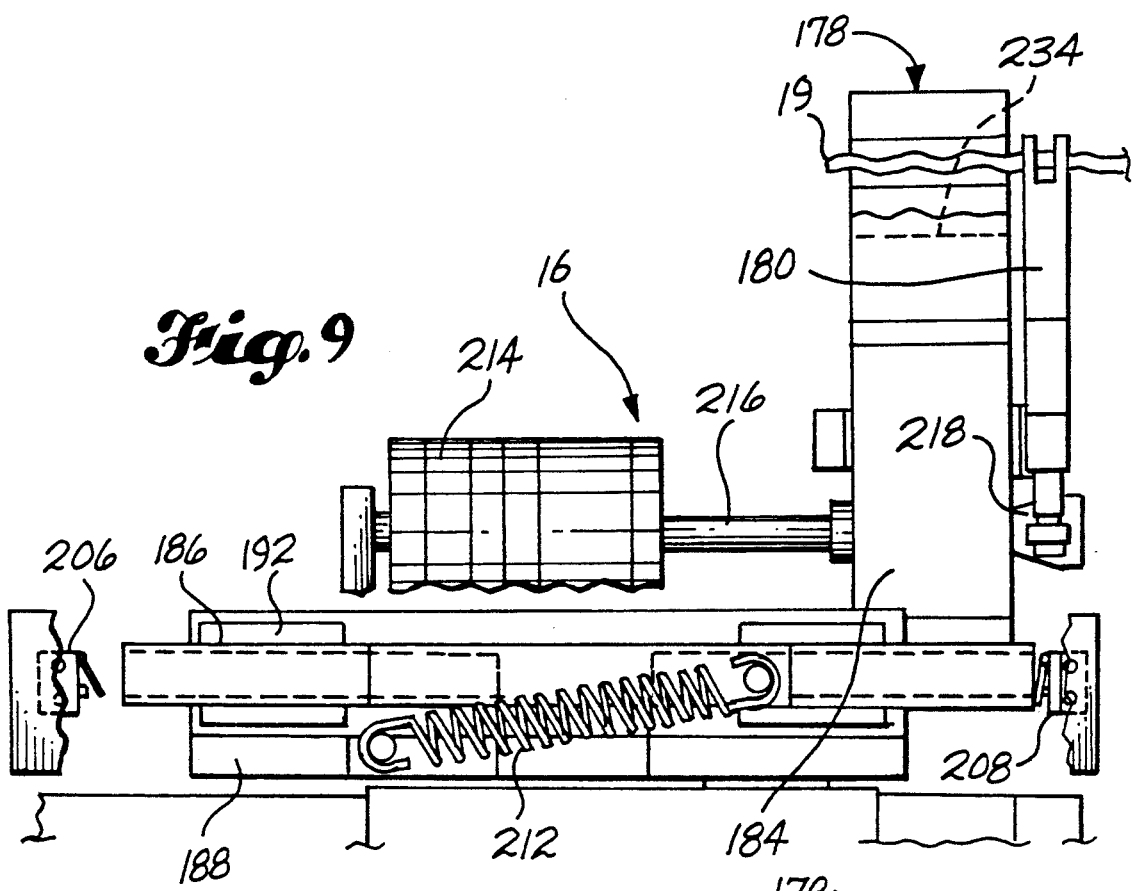
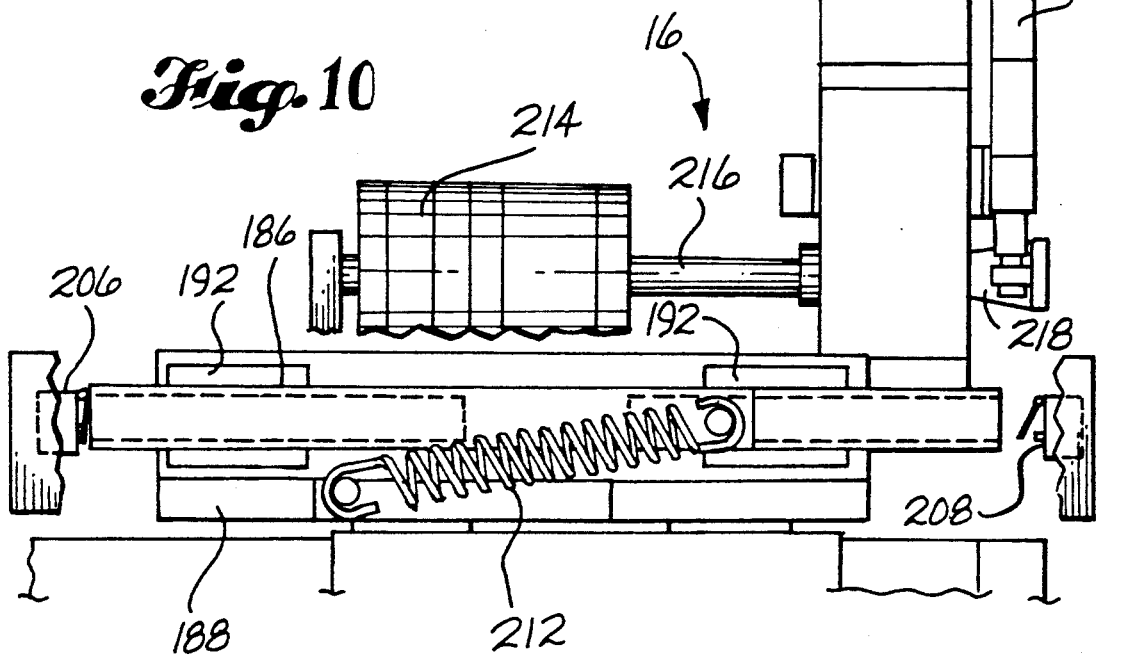

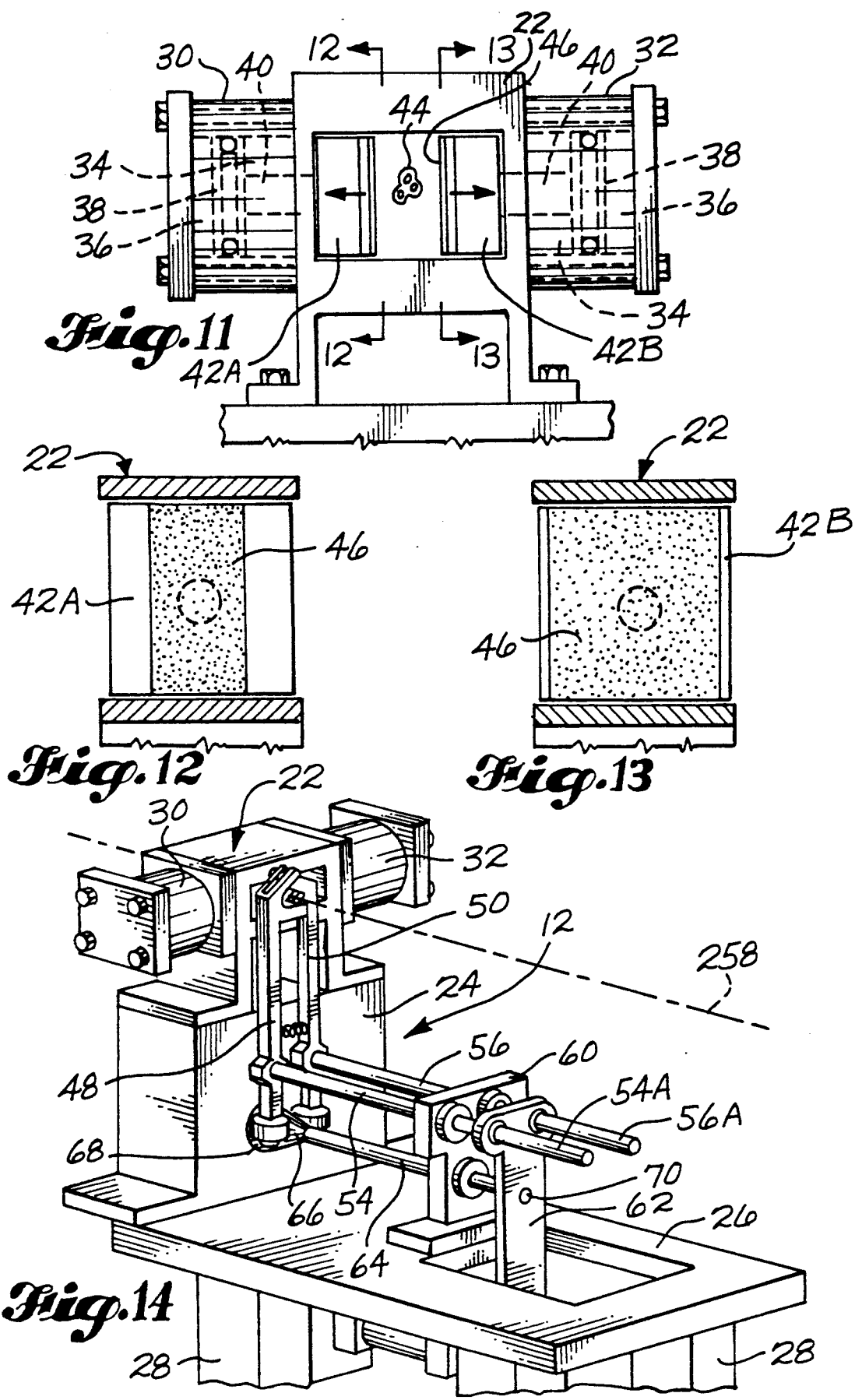

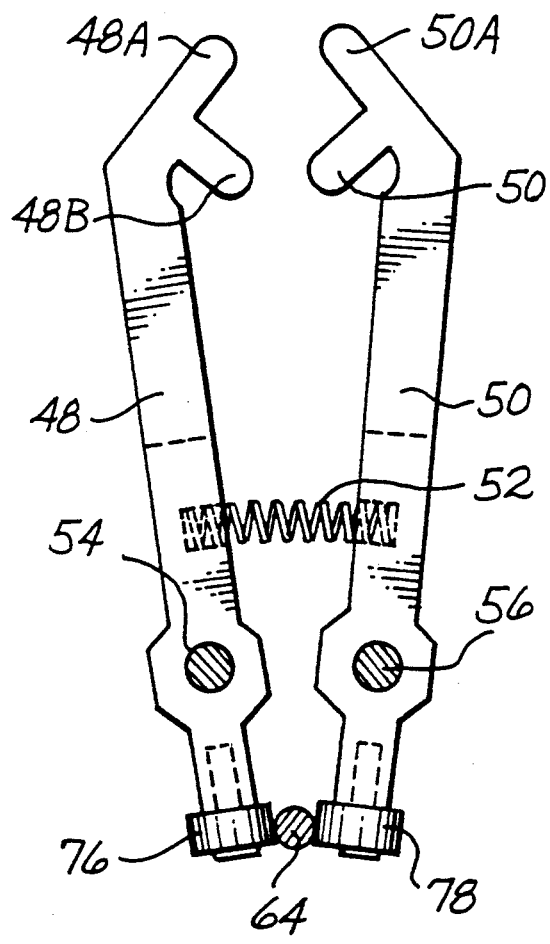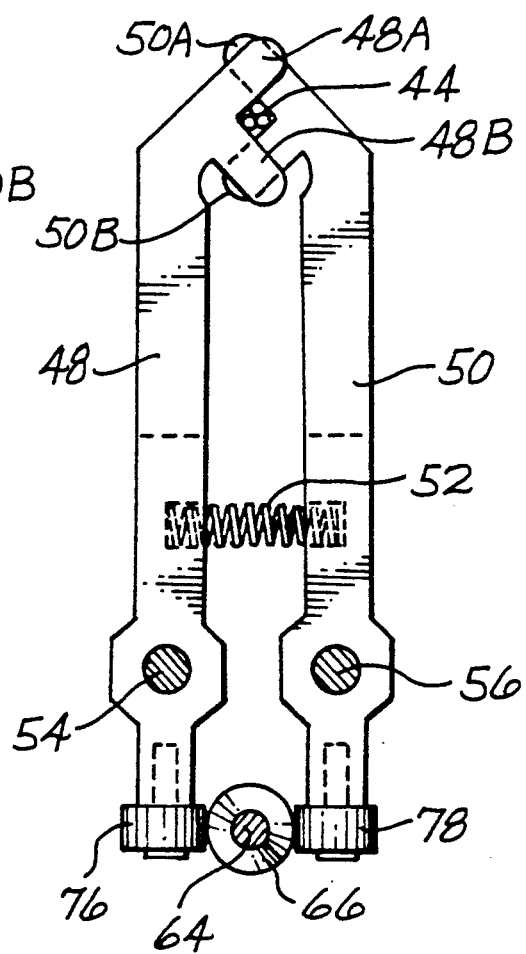

MACHINE FOR STRIPPING OUTER JACKET FROM MULTI-CONDUCTOR CABLES

TECHNICAL FIELD

The invention disclosed here generally relates to automated wire stripping machines. More particularly, the invention relates to wire stripping machines having blades or cutting elements which rotate about the end of a wire or cable, for severing its outer jacket.

RELATED PATENTS

The invention disclosed here is related to the subject matter of earlier issued U.S. Pat. No. 5,072,632 to Babak Sayyadi who is one of the joint inventors named here. The subject matter of the present case represents an alternative approach to stripping twisted-wire, multi-conductor cables when compared to the approach taken by the subject matter of the '632 patent

BACKGROUND ART

Stripping the ends of wires or cables by hand is undesirable in situations where large numbers of such items must be stripped. In the aircraft manufacturing industry, for example, literally hundreds of thousands of wires are stripped each year by any given aircraft manufacturer. Automated wire stripping machines have been developed for types of wire other than multi-conductor, jacketed and shielded wire. Since there are significant differences in the many types of wires that must be stripped, a machine that is well-suited for stripping one type of wire may not be suited for another. Consequently, different kinds of specialized stripping machines have evolved over the years.

The present invention was designed with a view towards stripping a particular type of multi-conductor, twisted wire, jacketed and shielded cable. Basically, such cable is characterized in that it has two or more individually insulated wires that are twisted around each other. The twisted wires are surrounded by a braided metal shield or sheath, the latter being further surrounded by an outer jacket. The jacket tightly surrounds the underlying sheath and wires, and the twisted configuration of the wires imparts an irregular outer contour to the jacket. Such contour makes it difficult, if not impossible, to use conventionally-designed wire strippers for severing the jacket near the cable's end during a stripping operation without damaging the underlying shield.

A review of the prior art shows that most automated wire stripping machines can be categorized into two groups: one group involves the use of cutting elements which are linearly driven into the insulation covering that is to be cut, typically from opposite sides of the conductor. Often times, the cutting elements have sharp edges that are sized to more or less correspond to the gauge of the wire being stripped. The second group involves a rotary severing action where one or more cutting elements are brought into contact with the insulation as they rotate about its outer circumference. Sometimes, the cutting elements are circular and have depth guides that prevent them from cutting into more than a certain depth of the insulation surrounding the wire. Both groups are typically used to strip wires having a circular outer circumference, and are not capable of stripping irregular wires or are otherwise not very well suited for such task.

The '632 patent cited above represents one attempt at developing a machine capable of stripping irregular cables.

The present invention is a universal tool that provides a different approach to severing and stripping an irregular cable which is different from the approach disclosed in the '632 patent, and is believed to be different from other approaches disclosed in the prior art.

SUMMARY OF THE INVENTION

The invention is a wire-stripping machine that is particularly well-suited for stripping the end region of a wire or cable having an irregular outer contour. In general terms, the invention includes a base upon which a forward wire-gripping assembly, a rearward insulation-pulling assembly and an intermediate knife hub assembly are all mounted. The forward wire-gripping assembly is adapted to grip and hold an interior portion of the wire or cable, or in other words, a portion not to be stripped that is a certain distance inwardly from the end. Such portion is held in a fixed position during the stripping operation.

The forward gripping assembly has a wire-gripping device that includes a pair of double-acting or reciprocating air cylinders, each of which drives a pressure foot. The air cylinders are axially aligned, but spaced apart relative to each other so that their respective pressure feet move toward and away from each other as the air cylinders extend and retract. When the cylinders are extended, the pressure feet cooperatively grip the wire. When apart, a pathway is defined through the wire-gripping device leading into the knife hub.

The forward wire-gripping assembly also has a pair of spreadable gripper fingers which are positioned immediately forward of the pressure feet. These fingers serve to center the wire prior to extension of the air cylinders.

In many respects, the rearward insulation-pulling assembly is similar to the forward wire-gripping assembly just described. The rearward assembly has its own wire-gripping device that operates in much the same way as the forward wire-gripping device of the gripping assembly. That is to say, the rearward wire-gripping device also has a pair of extendible and retractable air cylinders with pressure feet for gripping the end of the wire, and spreadable gripper fingers for positioning the end of the wire relative to such pressure feet. In the case of the rearward device, however, its purpose is to grip the slug portion of the wire, such portion being the part of outer insulation or jacket that is to be pulled from the wire.

Unlike the forward wire-gripping assembly, the rearward assembly is constructed in a manner so that the rearward wire-gripping device is axially movable back and forth in a direction that is generally endwise and parallel to the position of the wire when it is in the grip of the forward wire-gripping device. Such axial movement is accomplished by a drive motor that is mounted to the base of the wire stripper. The drive motor is operated by a pre-programmed controller, or the like. The controller also controls the other parts of the stripper in accordance with certain predetermined instructions.

When the machine is placed into use, the pressure feet and spreadable gripper fingers of both the forward and rearward wire-gripping devices are initially placed in an open condition. The end of the wire is inserted through the forward wire-gripping device, and thereafter through the knife hub, until it is in a position to be gripped by the rearward device.

The rearward insulation-pulling assembly further has a tubular sensor that is positioned immediately aft of the rearward wire-gripping device. The end of the wire passes through the gripping device and into the tubular sensor, where it triggers a sensor means indicating that the proper length of wire has been inserted, or that the wire is otherwise properly positioned for stripping. The sensor means then generates a signal which causes the controller to begin the stripping operation.

The knife hub is an assembly of parts that includes a circular housing carrying a pair of slider members. Such members are slidably movable both toward and away from each other. Each one has a central portion, and oppositely-extending flange portions which project laterally outward from opposite sides of the central portion. The central portion of each member carries a thermal knife element. Also, a pair of springs interconnect the flange portions of each slider members to the knife hub housing, and are biased so as to normally pull the slider members together.

The knife hub also has a pair of actuator arms which are pushed by pneumatic cylinders when the knife hub is in a certain home position, such actuator arms driving the slider members apart against the bias of the springs. This provides an axial pathway through the knife hub that passes in between the thermal knife elements. The end of the wire is extended along such pathway from the forward wire-gripping assembly to the rearward insulation-pulling assembly when it is initially inserted into the machine. Once the wire is clamped and the stripping operation begins, the actuator arms are released, thereby allowing the thermal knife elements to come together and contact the outer insulation covering or jacket on the wire.

The knife hub housing carries a circular drive sprocket and a drive belt interconnects such sprocket to a reversible hub drive motor. The hub drive motor is preferably a stepper motor that is operated by the controller.

During a typical stripping operation, the controller causes the hub drive motor to first rotate the knife hub housing in one direction, slightly more than 180°, and then rotate it back to its initial or "home" position. Depending on the type of jacket, such sequence may be repeated, or the temperature of the knife elements may be increased so that only one cutting cycle is required. During hub rotation, the thermal knife elements sever the jacket by essentially melting or burning through it. Thereafter, the drive motor of the rearward insulation-pulling assembly is operated by the controller in a manner so as to cause the rearward wire-gripping assembly to pull the severed slug from the end of the wire.

The wire stripping machine as generally summarized above will become better understood upon a review of the following description which describes the machine in greater detail, including its various parts and operation.

BRIEF DESCRIPTION OF THE DRAWINGS

In the drawings, like reference numerals and letters refer to like parts throughout the various views, and wherein:

FIG. 5 is a rearward view of a knife hub assembly portion of the machine shown in FIGS. 1 and 2;

FIG. 6 is a side elevation of the knife hub assembly shown in FIG. 5;

FIG. 9 is a view similar to FIG. 4, and shows the rearward insulation-pulling assembly portion of the machine placing tension on the wire during a stripping operation;

FIG. 10 is a view like FIG. 9, but shows a carriage or tension frame portion of the insulation-pulling assembly in a slightly different position where no tension is on the wire during a stripping process;

FIG. 11 is a frontal view of a wire-gripping device in accordance with the invention;

FIG. 12 is an end view of a pressure foot which makes up a portion of the wire-gripping device shown in FIG. 11, and is taken along line 12—12 in FIG. 11;

FIG. 13 is a view similar to FIG. 12, but shows a second pressure foot and is taken along line 13—13 in FIG. 11;

FIG. 14 is a pictorial view of the forward wire-gripping assembly portion of the machine shown in FIGS. 1, 2 and 3;

FIG. 18 is a frontal view of a pair of spreadable gripper fingers;

FIG. 19 is a view like FIG. 18, but shows the gripper fingers in a closed condition;

BEST MODE FOR CARRYING OUT THE INVENTION

Machine Structure

Figure 1:
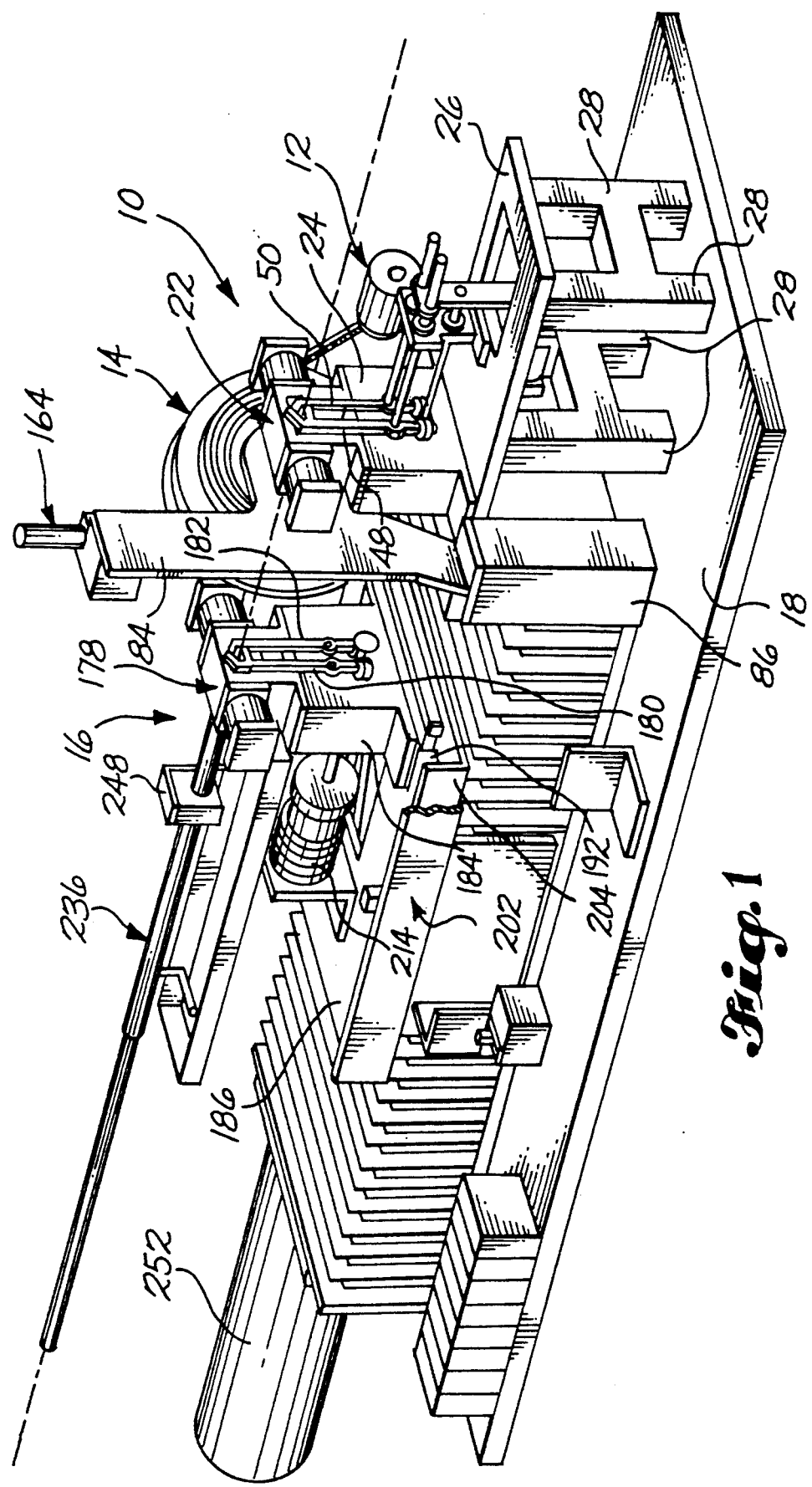
FIG. 1 is a pictorial view of a wire stripping machine in accordance with a preferred embodiment of the invention.

Referring now to the drawings, and first to FIG. 1, shown generally at 10 is a wire stripping machine in accordance with a preferred embodiment of the invention. As mentioned above, the machine 10 is particularly well-suited for stripping the type of twisted-wire, multi-conductor cables described above. For the sake of understanding the terminology used herein, it should be appreciated that use of the term "wire" or "cable" should be taken to mean the same thing. Although the machine 10 was designed, in preferred form, to strip a particular type of cable, it is nevertheless possible that it could be used for stripping other types of wires or cables as well. Therefore, the term "wire" is used here more often than "cable".

The stripping machine 10 is made up of primarily three assemblies or subassemblies. The first is a forward wire-gripping assembly, which is generally indicated at 12. The second is a knife hub assembly, generally indicated at 14. Lastly, the third is a rearward insulation-pulling assembly, generally indicated at 16. The knife hub assembly 14 is positioned between the forward 12 and rearward 16 assemblies. All of the assemblies just described are mounted to a base or base plate 18.

Figure 2:
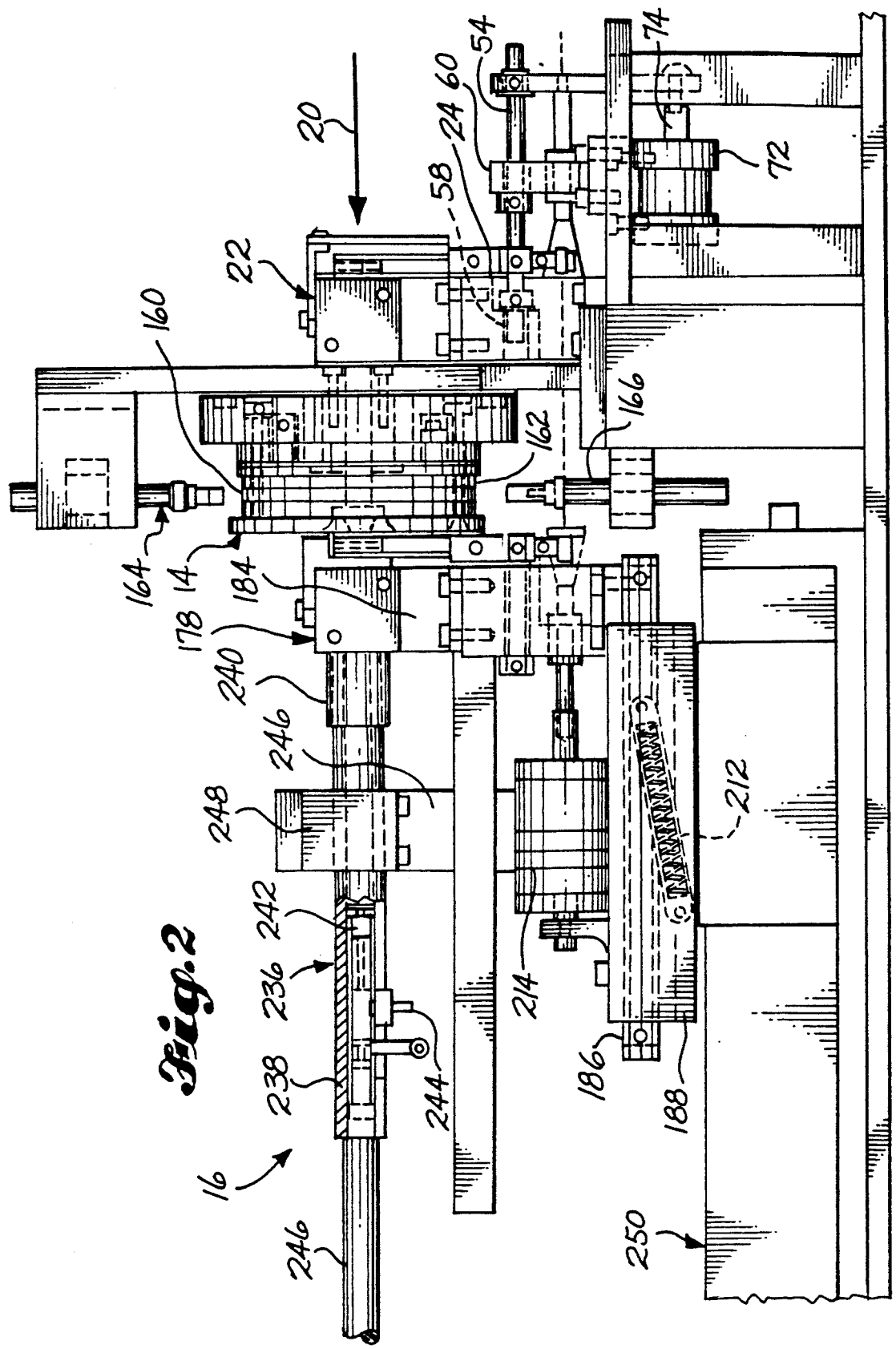
FIG. 2 is a side elevation of the machine shown in FIG. 1, with a sensor area of the machine being shown in partial cross-section.

Referring now to FIG. 2, when a wire or cable is to be stripped by the machine 10, its leading end 19 is fed into the machine from right to left, as indicated by arrow 20. The forward wire-gripping assembly 12 has a forward wire-gripping device 22 that is mounted on top of a pedestal 24. The pedestal 24 is likewise mounted to a horizontal table 26 that is supported a certain distance above base plate 18 by a plurality of vertical table supports, each of which is indicated by reference numeral 28.

Figure 17:
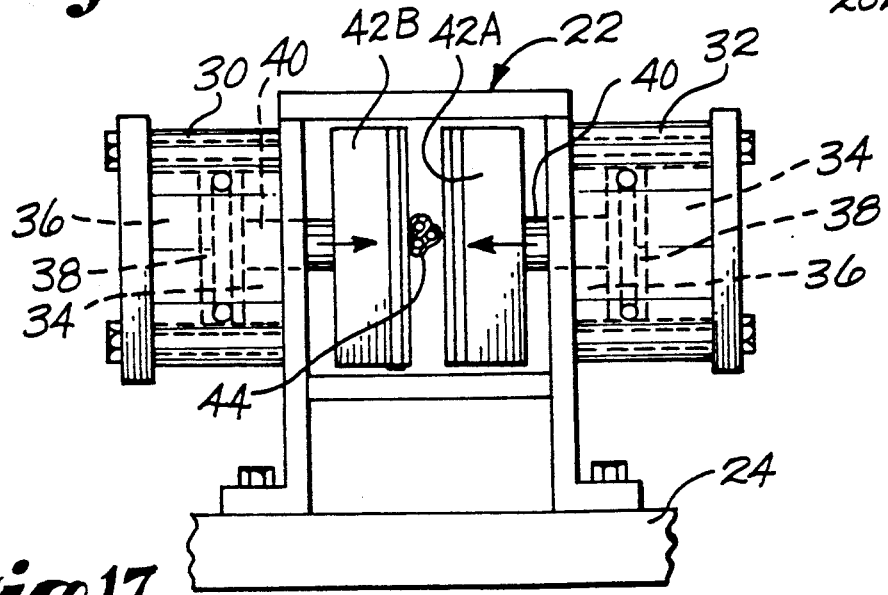
FIG. 17 is a view like FIG. 11, but shows the wire-gripping device closing upon a wire.

FIGS. 11, 14 and 17 are illustrative as to how the forward wire-gripping device 22 works. Directing attention first to FIG. 11, it can be seen there that the wire-gripping device 22 has a pair of double-acting actuators 30, 32, which project from opposite lateral sides of the device. Preferably, both actuators 30, 32 are pneumatically operated, and reciprocate back and forth depending on the delivery of pressurized air to one of two chambers 34, 36 on opposite sides of an actuator piston 38.

An actuator drive rod 40 extends inwardly from each piston 38. The drive rods 40 of both actuators are movable along the same axis, and each carries a pressure foot 42a, 42b at its outer end. The actuators 30, 32 are operated symmetrically and simultaneously so that the pressure feet 42a, 42b either come together or spread apart substantially at the same time.

Referring again to FIG. 1, when the leading end 19 of the wire is fed into the machine 10, the actuators 30, 32 of the forward wire-gripping device 22 are retracted so that the device 22 is in the open condition shown in FIG. 11. This permits the wire to be fed through the forward wire-gripping assembly 12 and deeper into the machine 10. In FIG. 11, the wire is indicated at 44, and is shown to be a twisted-wire, multi-conductor cable. It is clamped in fixed position in gripping device 22 by extending pressure feet 42a, 42b into the closed condition shown in FIG. 17.

FIG. 12 is an end view of the left-hand pressure foot 42a, while FIG. 13 is an end view of the right-hand pressure foot 42b. As is shown there, both pressure feet 42a, 42b have roughened surfaces 46 for better gripping the wire. By way of example, these surfaces 46 could be made of latex or gum rubber. Depending on the type of material making up the outer covering or jacket of the wire, one type of surface will be better than another. Jackets made of Kapton (TM) or Tefzel (TM) can be pulled off with a latex or rubber surface. Regular neoprene rubber would not be adequate for such task. Teflon (TM) would require a combination of metal grit-type sandpaper vulcanized to rubber on surfaces 46. The type of metal grit which works best is a perforated type. In any event, it may be desirable to make the pressure feet 42a, 42b easily detachable from drive rods 40 so that one type of gripping surface can be easily replaced with another.

FIG. 14 shows a pair of spreadable gripper fingers 48, 50 which are positioned immediately forward of the cylinders 30, 32 and pressure feet 42a, 42b of gripping device 22 as just described. These arms 48, 50 are better illustrated in FIGS. 18 and 19. Directing attention there, the gripper fingers 48, 50 are spread apart, as shown in FIG. 18, at the time the wire 44 is initially fed into the machine 10. Then, the outer ends of the fingers 48a, 48b, 50a, 50b close about the wire 44, and function to center it relative to the pressure feet 42a, 42b. As such, the gripper fingers 48, 50 have a centering as opposed to gripping function.

A conventional spring 52 interconnects gripper fingers 48, 50 and is biased to normally open them, thus spreading apart the ends of the fingers 48a, 48b, 50a, 50b. Both fingers 48, 50 are pivotably mounted to the forward pedestal 24 (see FIG. 14) by a pair of elongated guide rods 54, 56. As shown in FIG. 2, an inner end 58 of each guide rod 54, 56 extends into pedestal 24 where it is supported and held. A fixed slider block 60, mounted to table 26, supports the guide rods 54, 56 outwardly and forwardly of the pedestal 24. A drive arm 62 is slidably mounted to the outer ends 54a, 56a of the guide rods, outwardly of the slider block 60. A cam rod 64 extends underneath guide rods 54, 56 from the drive arm 62 into the pedestal 24. The inner end 66 of the cam rod 64 is enlarged or bulbous and extends into a circular space or recess 68 in pedestal 24. The outer end is fixedly connected to the drive arm 62 as shown at 70. The cam rod 64 is otherwise free to slide back and forth through slider block 60.

Figure 3:
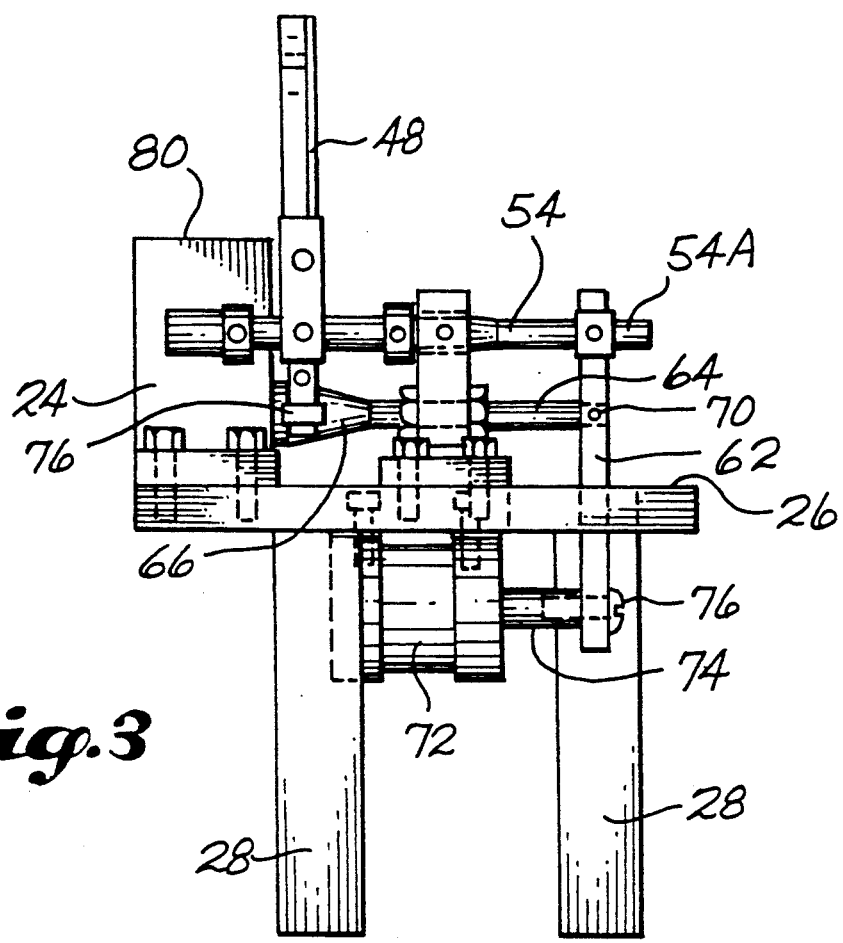
FIG. 3 is a side elevation of a forward, gripper arm portion of the machine shown in FIGS. 1 and 2.

Referring now to FIGS. 2 and 3, another double-acting air cylinder 72, which is mounted underneath table 26, functions to move vertical drive arm 62 back and forth. The latter air cylinder 72 is conventional in nature, and has a reciprocating drive rod 74, the end of which is connected to the vertical drive arm 62 by a bolt 76. As is best seen in FIG. 3, the bolt 76 extends through the lower end of vertical drive arm 62 and is axially threaded into the drive rod 74.

Extension of the drive rod 74 causes the cam rod 64 to be pulled outwardly relative to pedestal 24. This, in turn, pulls the enlarged end 66 of the cam rod out of the circular space 68 in the pedestal 24, and in between a pair of end rollers 76, 78 at the lowermost ends of gripper fingers 48, 50. As is best seen in FIG. 19, such pulling action spreads the rollers 76, 78 apart, and causes gripper finger ends 48a, 48b, 50a, 50b to close about the wire 44.

Reversing the action of air cylinder 72 extends the end of the cam rod 64 back into the pedestal 24, thereby enabling the gripper finger spring 52 to once again spread the gripper fingers 48, 50 apart. It should be mentioned at this point in time that FIG. 3 is illustrative of the gripper finger assembly just described, including the components which are necessary to open and close the gripper fingers 48, 50. However, such FIG. does not include the previously-described gripping device 22 as shown in FIG. 11, which would otherwise be mounted to the top surface 80 (see FIG. 3) of the pedestal 24.

Directing attention now to FIGS. 5–8, the knife hub assembly 14 will now be described. Referring first to FIG. 5, the knife hub assembly 14 includes a circular knife hub 82 which houses various components for cutting through the outer jacket of the wire 44. The knife hub housing 82 is rotatably mounted to a vertical hub support 84 that upstands vertically from machine base 18. More specifically, and as is best seen in FIG. 1, the hub support 84 is fixedly mounted to a vertical block 86 which is further mounted to machine base 18. The machine base 18 is not shown in FIGS. 5 and 6.

The knife hub 82 is rotatably mounted to support 84 by conventional means. However, as can be seen in FIG. 6, an axial pathway 87 is provided through the mounting structure substantially along the axis of rotation of the knife hub 82. The knife hub 82 is driven in rotation by a reversible knife hub drive motor 88 which is connected to the knife hub 82 by a drive belt 90. The knife hub 82 carries a circular drive pulley or sprocket 92 about which the drive belt 90 extends. The hub drive motor 88 has a conventional drive pulley 94 for driving belt 90 in one direction or another, depending on how hub drive motor 88 is operated.

Figure 8:
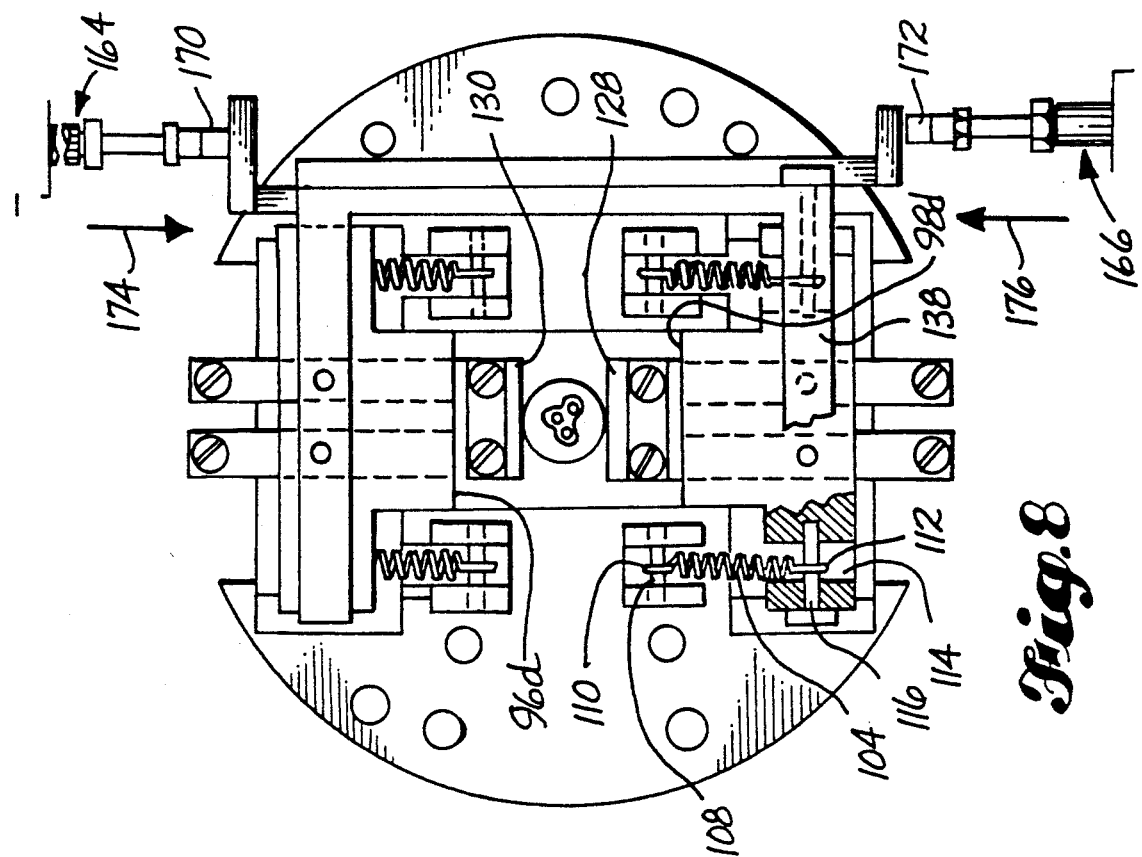
FIG. 8 is a view like FIG. 7, but shows how a pair of thermal knife elements carried by the hub are opened for enabling a wire to be passed through the hub.
Figure 7:
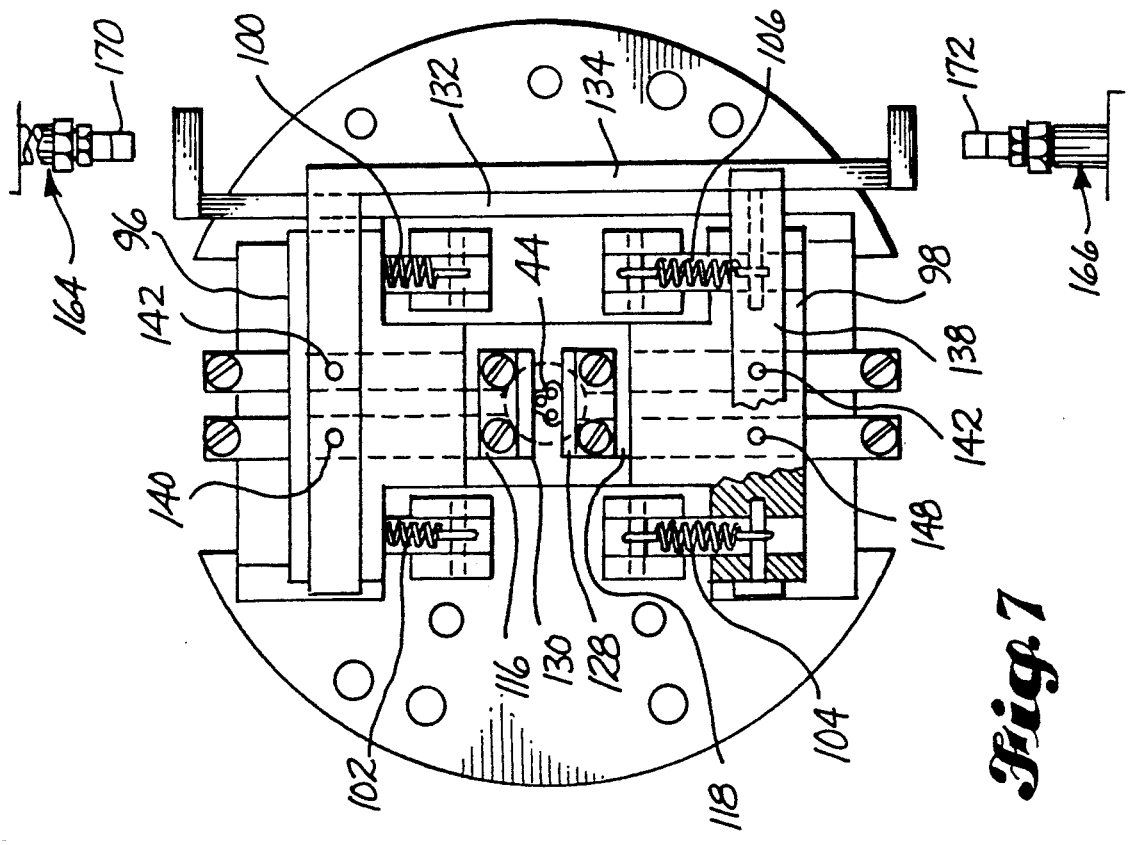
FIG. 7 is a frontal view of a knife hub housing constructed in accordance with the invention, such housing making up a part of the knife hub assembly shown in FIGS. 5 and 6.

Referring now to FIGS. 7 and 8, the interior of knife hub 82 will now be described. The knife hub 82 carries a pair of slider members 96, 98 which function to close upon and cut the jacket of the wire 44. The slider members 96, 98 are normally pulled inwardly toward each other and the wire 44 by springs 100, 102, 104, 106. An upper pair of springs 100, 102 is biased to normally pull the upper slider member 96 downwardly, while the lower pair 104, 106 is biased to pull the other slider member 98 upwardly.

Referring now to FIG. 8, and in particular, to the hub spring 104 shown in the lower left-hand portion of the knife hub 82, an inner end 110 of each spring 100, 102, 104, 106 just described is connected to knife hub 82 by a pin 108. Similarly, the spring's other or outer end 112 extends into a cylindrical opening 114 in the slider member 98, and is held in place by another pin 116 which extends transversely across such opening (see also, FIG. 23).

Figure 22:
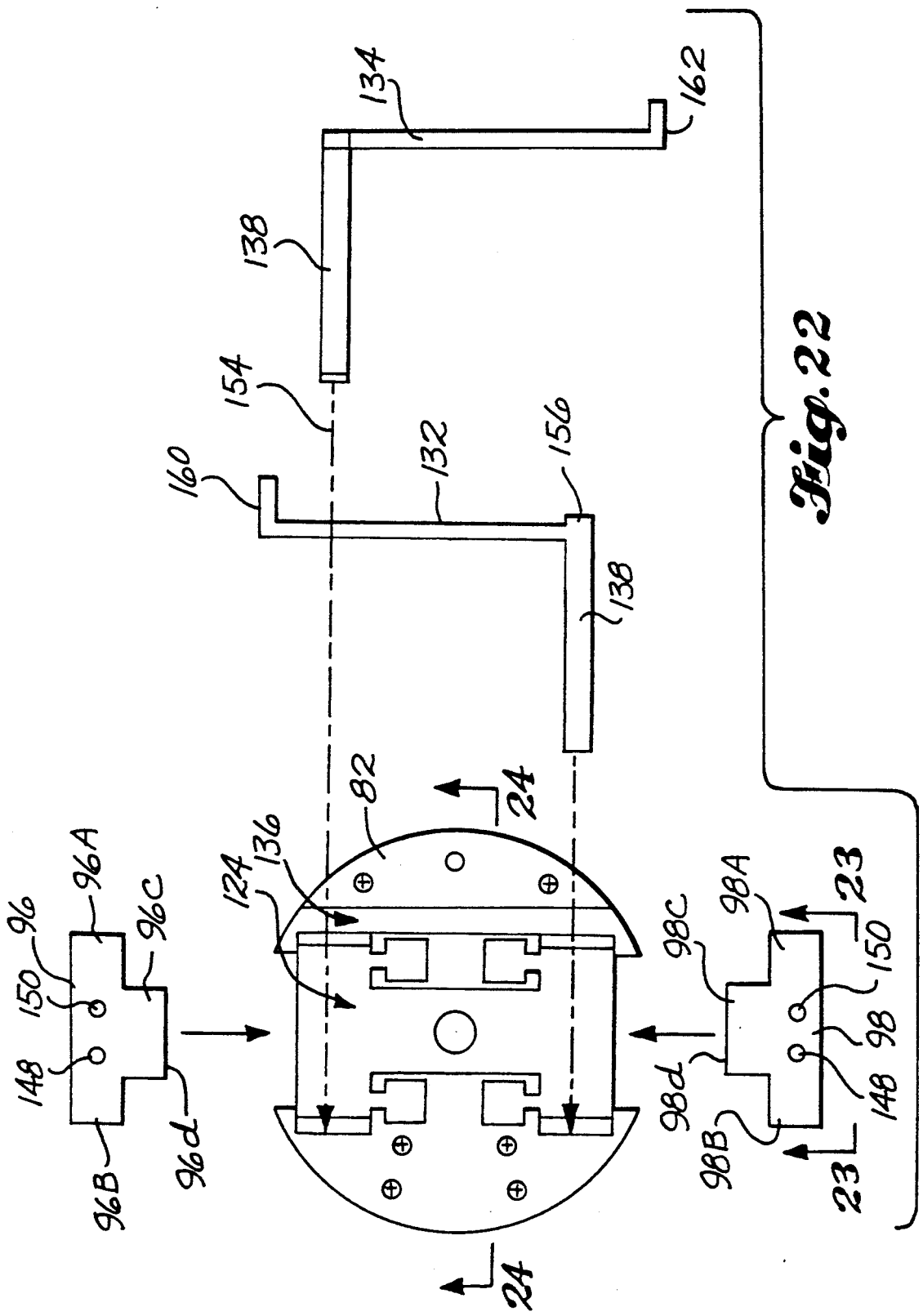
FIG. 22 is an exploded view of the knife hub housing shown in FIGS. 7 and 8.

FIG. 22 shows an exploded view of the knife hub 82 minus the spring and pin connections just described. Directing attention there, both slider members 96, 98 have outwardly projecting flange portions 96a, 96b, 98a, 98b which project laterally outwardly from opposite sides of a central portion 96c, 98c.

Figure 23:
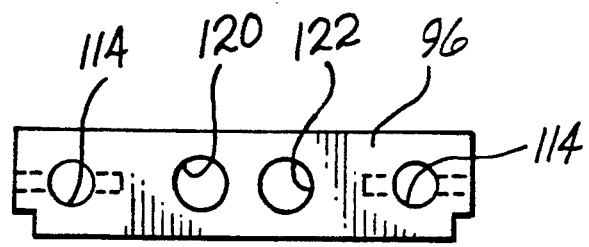
FIG. 23 is an end view of a slider block or slider member carried by the housing shown in FIGS. 7 and 8, and is taken along line 23—23 in FIG. 22.

During assembly of the knife hub 82, conventional resistance heating elements or electrodes 116, 118 (see FIGS. 7 and 8) are inserted lengthwise through a pair of openings 120, 122 which extend lengthwise through the central portions 96c, 98c of the slider members 96, 98 (see also, FIG. 23). Each heating element 116, 118 is conventional in nature and has a separate conductor extending through one of the slider member openings 120, 122. In other words, a total of two conductors 116, 118 extend through each slider member 96, 98. Preferably, each slider member 96, 98 is made of a non-conductive material that is resistant to heat. Each heating element 116, 118 may be held in place within slider member openings 120, 122 by a conventional filler, such as a resinous epoxy, for example.

After attachment of the heating elements 116, 118 to the slider members 96, 98, the outer ends of the springs 100, 102, 104, 106 are then connected to the flange portions 96a, 96b, 98a, 98b of the slider members 96, 98. Then, the slider members 96, 98 are laid within opposite end portions of a recessed area 124 that is cut diametrically across the hub housing 82. This is followed by connecting the inner end 110 of each spring 100, 102, 104, 106 to the hub housing 82 in the manner described above.

It should be appreciated that the springs 100, 102, 104, 106 and the pins which are used to connect such springs to the various components described above are not shown in FIG. 22. Thermal knife edges or elements 128, 130 are connected to the heating elements 116, 118 described above inwardly of the innermost end 96d, 98d of the central portion 96c, 96d of each slider member 96, 98. These elements 128, 130 are conventional in nature and heat-up via electrical resistance when current is transmitted through heating elements 116, 118. Their temperature should be sufficiently high so as to melt through the outer jacket of the wire 44 upon contact.

The knife elements 128, 130 are normally closed together as a result of the inward bias created by springs 100, 102, 104, 106. In order to feed the end of the wire into the wire stripping machine 10 and through the knife hub 82, in the manner generally indicated by arrow 20 in FIG. 2, the knife elements 128, 130 must first be spread apart to the position shown in FIG. 8. This, of course, requires that the slider members 96, 98 also be spread or moved apart against the bias of springs 100, 102, 104, 106.

Figure 24:
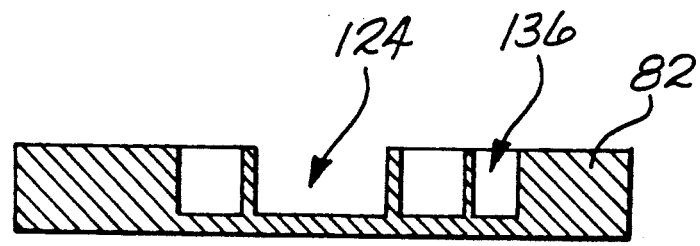
FIG. 24 is a cross-sectional view of the knife housing shown in FIGS. 7 and 8, and is taken along line 24—24 in FIG. 22.

The slider members 96, 98 are moved apart by elongated actuator arms 132, 134 which are positioned in sliding contact side-by-side each other at one side of slider members 96, 98. Referring briefly to FIG. 24, the actuator arms 132, 134 are received within a side channel 136 that also extends diametrically across one side of hub 82 (see also, FIG. 22).

Each actuator arm 132, 134 has a drive bar 138 which extends transversely and functions to fixedly connect one actuator arm to one slider member 96, 98. For example, referring to FIGS. 7 and 8, the drive bar 138 at the lower end of the laterally-innermost actuator arm 132 extends transversely across the lower slider member 98. It is fixedly connected to the slider member 98 by pins 140, 142 which extend through openings in the side bars 138 and into pin openings 148, 150 in the slider members 96, 98.

The drive bar 138 could be connected to the slider member 98 in any number of different ways. For example, it is conceivable that the drive bar 138 could be bonded to the slider member 98 by using epoxy instead of pins. It may be preferable to construct each drive bar 138 so that it has an elongated "C" shape with downwardly-extending ends which overlap the outer lateral ends of slider member flange portions 96a, 96b, 98a, 98b. In such case, the pins 116, which retain the ends 112 of the springs 104 in each slider member 96, 98, would also extend through the overlapping ends of the slider member, thereby providing a further connection of slider bar to slider member. This is not shown in the drawings, however, as it is not critical to what is considered to be the invention claimed here.

The drive bar 138 of the other actuator arm 134 passes over the top of the first actuator arm 132, in order to enable its connection to the upper slider member 96, as shown by arrow 154 in FIG. 22. The upper drive bar 138 is otherwise connected to the upper slider member 96 in the same manner as what was described above. Lastly, the first actuator arm may have a small guide tab 156 that slidably rides on top of the second 134.

The slots 152, 158 in both actuator arms 132, 134 should be sufficiently long enough to permit one actuator arm to slide relative to the other a certain distance so as to permit opening of the slider members 96, 98 to the position shown in FIG. 8. Each actuator arm 132, 134 has a horizontally-extending flange 160, 162 which are used to drive the actuator arms for opening the slider members 96, 98 as will now be described.

Referring now to FIGS. 2, 5 and 6, the knife hub assembly 14 further includes a pair of vertically-aligned pneumatic actuators 164, 166 which are positioned on opposite sides of the knife hub 82. Such actuators are used to spread apart or otherwise open the knife elements 128, 130 for insertion of the wire 44 into the machine 10. Referring now to FIG. 5, the knife elements 128, 130 are opened by causing the hub drive motor 88 to rotate the knife hub 82 to a "home" position shown in FIG. 5. It should be mentioned at this point that all of the various knife hub components described above are held in position in hub housing 82 by a circular cover plate 168. However, the horizontal flanges 160, 162 of the actuator arms project outwardly beyond the radius of such plate 168 so that they will be adjacent the working ends of the actuators 164, 166 when the hub 82 is in the "home" position.

Referring now to FIG. 8, extension of the actuators 164, 166 causes their ends 170, 172 to contact the horizontal flanges 160, 162 and push the actuator arms 132, 134 inwardly, in the directions indicated by arrows 174, 176 in FIG. 8. This, in turn, moves the inner ends of the actuator arms 132, 134 outwardly, and causes the slider members 96, 98 to spread apart.

After the wire 44 is passed through the hub 82, then the actuators 164, 166 are retracted, thus enabling the knife elements 128, 130 to be pulled together by hub springs 100, 102, 104, 106 and into contact with the outer jacket of the wire. The knife hub 82 is then rotated while the heating elements 116, 118 are activated, thereby causing the knife elements 128, 130 to cut through the jacket as the hub rotates. This operation will be further described later after the insulation-pulling assembly 16 is explained.

Figure 15:
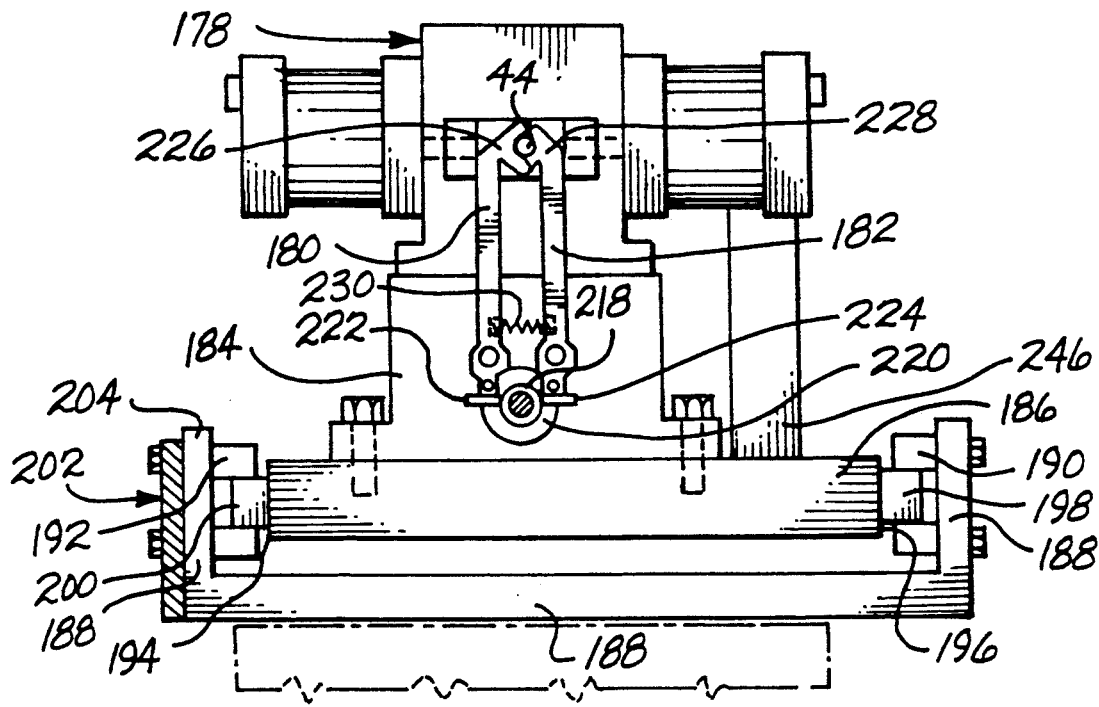
FIG. 15 is a frontal view of the rearward insulation-pulling, assembly portion of the machine shown in FIGS. 1 and 2.

The rearward insulation-pulling assembly 16 of the machine 10 has certain aspects that are very similar or nearly identical to the forward wire-gripping assembly 12 already described. Specifically, the insulation-pulling assembly 16 has a rearward wire-gripping device 178 and a pair of rearward gripper fingers 180, 182 which are similar in construction and operation to the forward wire-gripping device 22 and gripper fingers 48, 50 (see FIG. 14, for example). A frontal view of the rearward device and fingers 178, 180, 182 is shown in FIG. 15. There is no significant difference in structural make-up between the various parts making up the rearward device 178 and the forward device 22. Therefore, no further detailed description of the rearward device should be required in order to understand how it is built or otherwise operates.

The rearward device 178 is mounted to its own base pedestal 184, the latter being further mounted to a horizontal mounting plate or slider table 186. The slider table 186 is carried by a U-shaped wire-tension frame, indicated at 188. The slider table 186 is slidably mounted to the tension frame 188 via conventional side bearing assemblies 190, 192 that are positioned adjacent opposite lateral sides 194, 196 of table 186. The table 186 has a lateral flange 198, 200 on each side that is in tongue-and-groove fitment with the bearing assemblies 190, 192. This arrangement enables the slider table 186 to freely slide back and forth a certain distance relative to the U-shaped tension frame 188.

Figure 16:
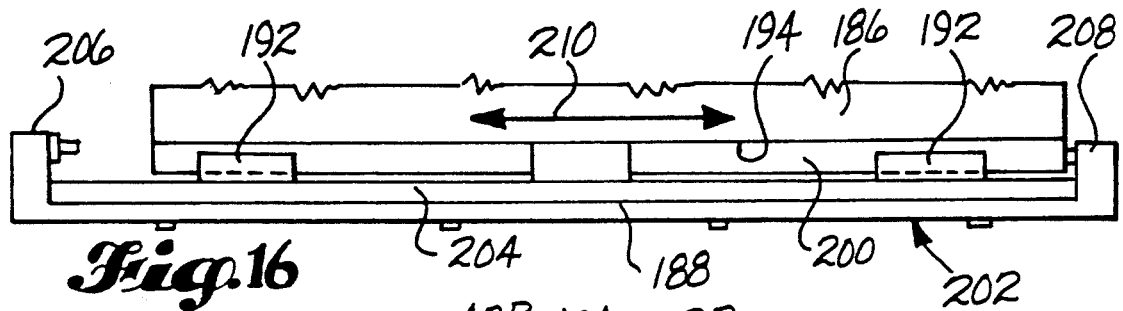
FIG. 16 is a fragmentary top plan view of the left-hand side of the rearward insulation-pulling assembly shown in FIG. 15.

Referring now to FIG. 16, movement of the table 186 relative to the underlying tension frame 188 is limited by a limit switch frame, indicated generally at 202. Such frame 202 is mounted directly to the left-hand flange 204 of tension frame 188 (see FIG. 15). It has limit switches 206, 208 at opposite ends which are positioned laterally inwardly with respect to the left-hand flange 204 of the tension frame, in a manner so that the limit switches 206, 208 are positioned across the path of travel of the left-hand edge or left-hand lateral flange 200 of the slider table 186.

Arrow 210 in FIG. 16 indicates the back and forth movement of the slider table 186 relative to the underlying tension frame 188. The table 186 is shown abutting against the forward limit switch 208. The signal from such switch, or from the other one 206, as the case may be, is used to control certain movements of the rearward insulation-pulling assembly 16 in a manner that is further described below. The limit switches 206, 208 may not be necessary as the back and forth movement could be controlled just as well via operation of a stepper motor 252, the latter device being further described later.

Referring to FIGS. 9 and 10, a spring 212 interconnects the slider table 186 and tension frame 188. Such spring is biased such that it normally pulls the slider table 186 to the aft position shown in FIG. 10. Its specific function will become more clear when the general operation of the machine 10 is described below.

Figure 4:
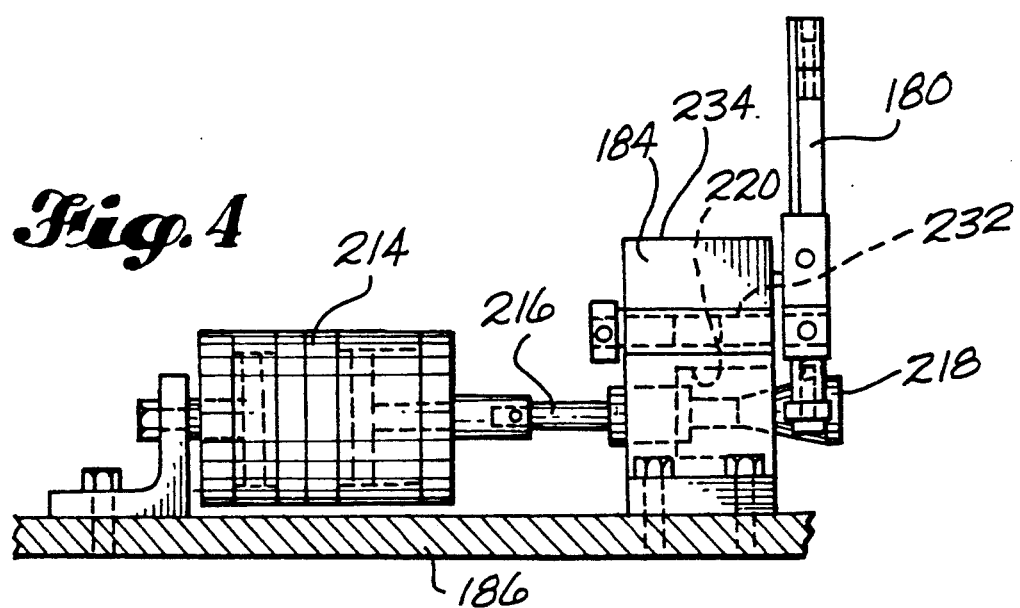
FIG. 4 is a side elevation of a rearward, gripper arm portion of the machine shown in FIGS. 1 and 2.

Also mounted to the slider table 186 is a pneumatic actuator 214 whose function is to open and close rear gripper fingers 180, 182 (see FIG. 4). Similar to the forward wire-gripping assembly 12 previously described, the rear actuator 214 is double-acting and drives a cam rod 216 back and forth. The cam rod has an enlarged end 218 that extends and/or retracts relative to a circular recess 220 in the rear pedestal 184. When extended, the cam end 218 spreads apart the rollered ends 222, 224 of the rear gripper fingers 180, 182, thereby causing their opposite ends 226, 228 to close about the end of the wire 44. Retraction of the cam end 218 into recess 220 enables the gripper finger spring 230, which is between the rear gripper fingers 180, 182, to push their outer ends 226, 228 apart.

As is best seen in FIG. 4, the rear gripper fingers 180, 182 are pivotably mounted to rear pedestal 184 by pins 232 extending through the body of the rear pedestal. It should be appreciated that FIG. 4 is similar to FIG. 3 in that it illustrates the components of the rearward insulation-pulling assembly 16 which are necessary to open and close rear gripper fingers 180, 182. The FIG. does not otherwise show the rearward wire-gripping device 178 that would be mounted to the top surface 234 of pedestal 184.

The rearward insulation-pulling assembly 16 also has a tubular sensor apparatus 236 positioned aft of the rear wire-gripping device 178. This apparatus is best seen in FIG. 2. Directing attention there, the sensor apparatus 236 is made up of a hollow, cylindrical tube 238, an inner end of which is received within a socket 240 that extends aft of the rearward gripping device 178. When the end of the wire 44 is inserted into the machine 10, it passes through the forward wire-gripping assembly 12, and through the knife hub assembly 14, into the rearward insulation-pulling assembly 16. The end 19 of the wire 44 is fed through rearward gripping device 178 (its pressure feet are open at such time) and into tube 238 until the wire pushes against a plunger 242. Movement of the plunger 242 causes a signal to be generated which indicates that the wire 44 is properly positioned for stripping.

The sensor apparatus is relatively conventional in design from the standpoint that movement of the plunger 242 may activate a proximity switch, schematically indicated at 244. The switch, in turn, generates a position signal which is used for control of the machine 10 in a manner described below. The position of the plunger 242 is otherwise controlled by a pneumatic air cylinder 246 which repositions the plunger 242 after each stripping operation.

The tubular part 238 of the sensor apparatus 236 is not fixedly connected to rearward wire-gripping device 178 via socket 240. However, the tube is otherwise held fixed in horizontal position by a vertical support 246, the latter being mounted to the slider table 186 on the right-hand side of the rear pedestal 184 (see FIG. 15). Therefore, the tube 238 moves back and forth as the slider table 186 moves. The position of the sensor apparatus 236 relative to the rearward gripping device may nevertheless be adjusted by disconnecting and reconnecting it at vertical support 246.

As is shown in FIG. 2, the tension frame 188 of the rearward assembly 16 is fixedly mounted to an assembly drive mechanism, which is generally indicated at 250. Such drive mechanism is conventional in nature and need not be described in great detail in order to understand how it works. Generally, it consists of a stepper motor 252 that is drivingly linked to tension frame 188 so that the frame and all components mounted thereto are movable back and forth by the motor 252. This, in turn, alters the position of the rearward wire-gripping device 178 and gripper fingers 180, 182 of the insulation-pulling assembly 16 relative to the knife hub and forward assemblies 14, 12.

Having described the various mechanical details of the stripping machine 10, the operation of the machine will now be described. It is to be understood that the machine 10 is intended to be operated automatically by means of a controller or computer. What is set forth below is not only the mode of operation, but the programming requirements for automated control as well.

Machine Operation and Programming Requirements

Figure 20:
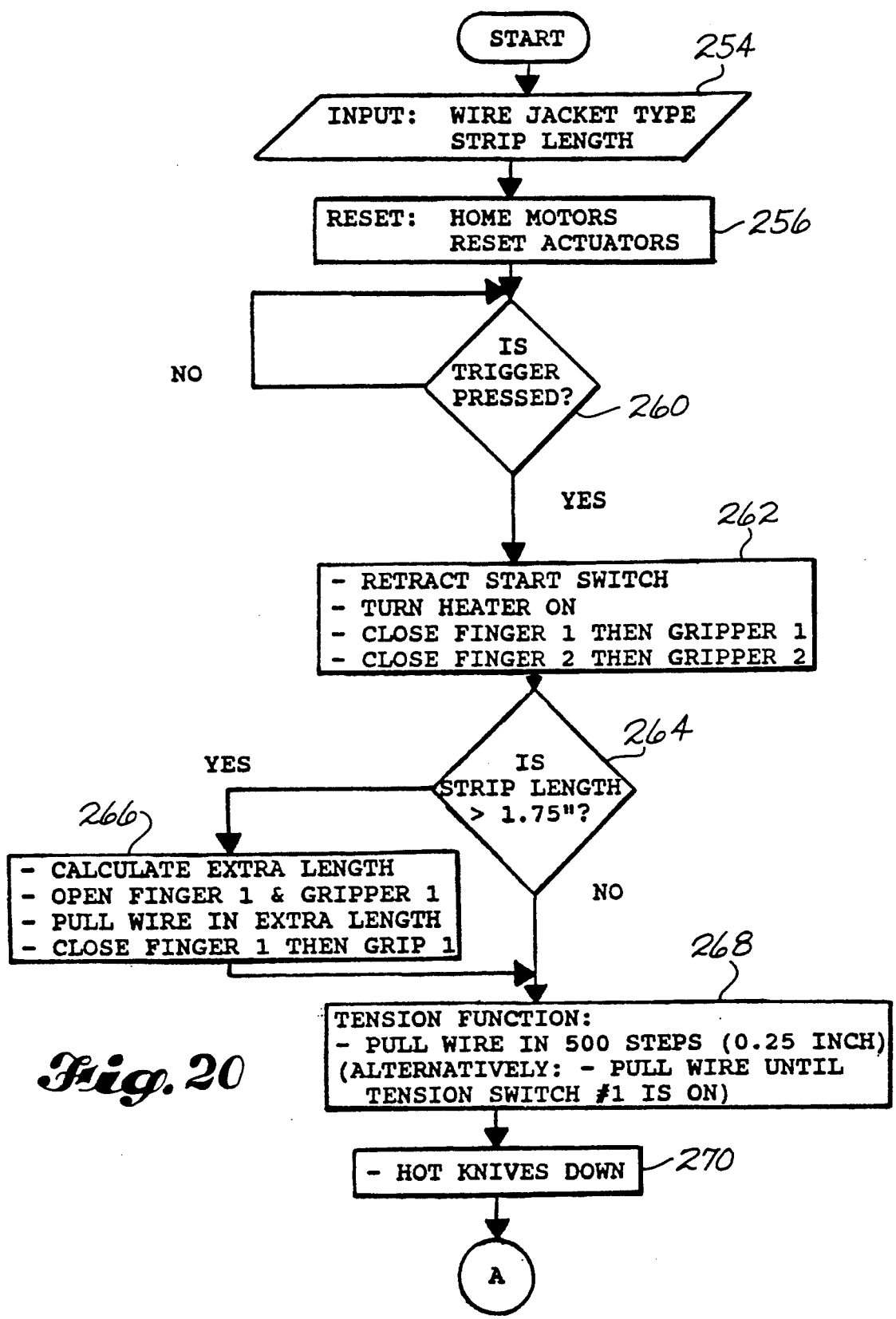
FIG. 20 is a flow chart illustrating the programming requirements for automatically controlling the machine shown in FIGS. 1–19.
Figure 21:
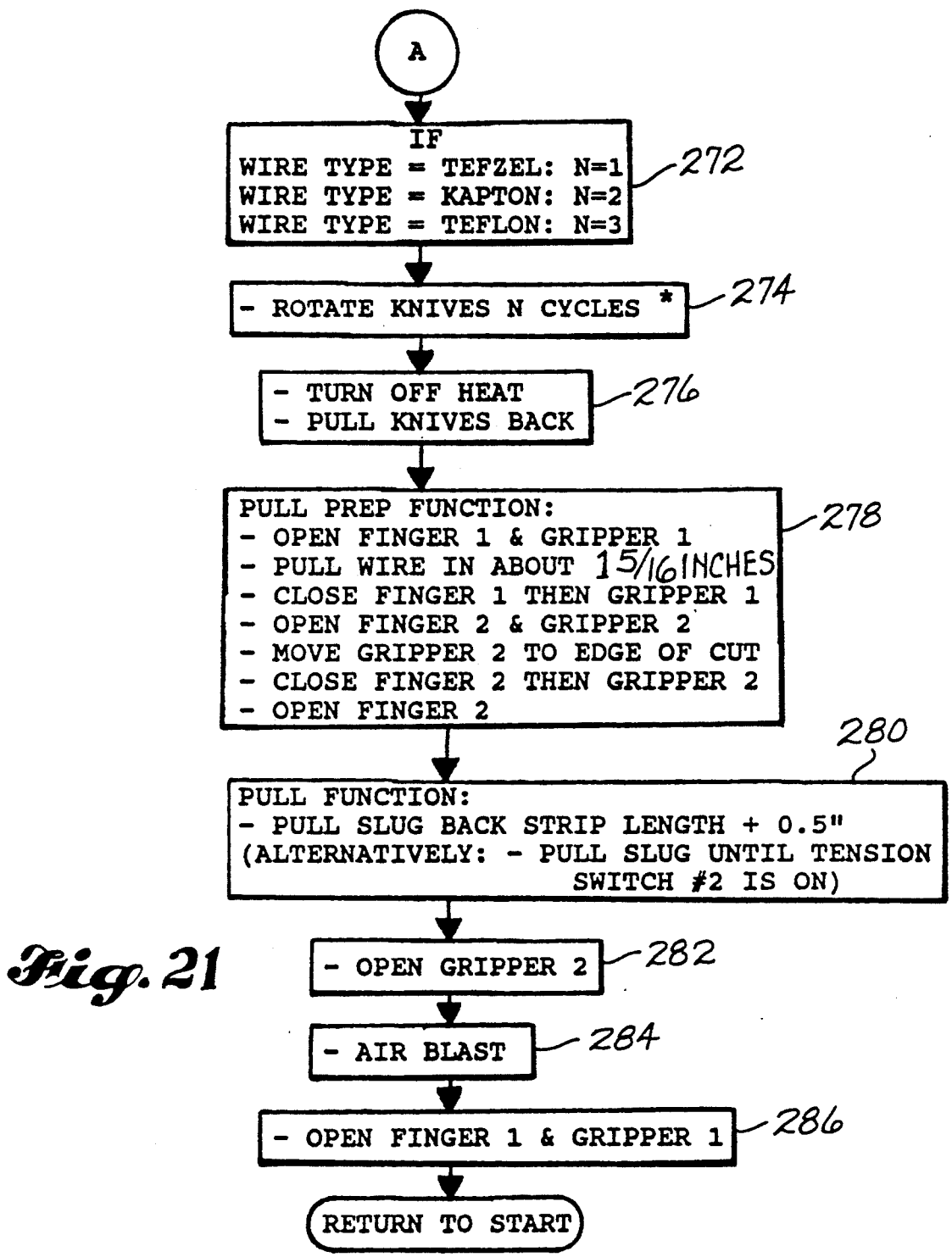
FIG. 21 is a flow chart like FIG. 20 and shows further programming requirements.

FIGS. 20 and 21 set forth a flow chart of the programmable control requirements for operating the machine 10. Directing attention first to FIG. 20, the user of the machine 10 first selects or inputs the type of jacket surrounding the wire, and the length of jacket to be stripped, as shown at 254. Length may vary depending on where the wire is to be used. Typically, a length of approximately 1.75 inches would be stripped, although the machine 10 automatically adjusts to other entered strip lengths that are greater.

It is anticipated that the material making up the jacket will be one of three types: Tefzel (trademark); Kapton (trademark); or Teflon (trademark). Since these materials have different characteristics with respect to toughness or heat resistance, it is likely that a different number of rotations of the knife hub assembly 14 would be required for one type of material as opposed to another.

After jacket type and length has been selected, the various motors making up the machine must be reset to an initial or "home" position, as is schematically indicated at 256. In particular, the hub drive motor 88, which drives the knife hub 82 in rotation via drive belt 90, must be rotated so that the horizontal flanges 160, 162 will be positioned across from actuators 164, 166 as shown in FIG. 5. As was described above, this is necessary in order to enable the actuators 164, 166 to extend and push the flanges 160, 162 inwardly, and thereby open the thermal knife elements 128, 130 inside the hub 82. Also, the stepper drive motor 252, which moves the rearward insulation-pulling assembly 16, must be initialized such that the rearward assembly is moved to position the rearward gripping device 178 immediately and gripper fingers 180, 182 adjacent the knife hub 82. The same step also involves initializing the position of all pneumatic actuators. Specifically, the double-acting actuators 30, 32 of both the forward and rearward wire-gripping devices 22, 178 must be moved to the open condition (see FIG. 11) so that the wire 44 may be fed through the machine. Likewise, the air cylinders 72, 214 must be retracted so that the enlarged end 66, 218 of each cam rod is pulled into its respective pedestal recess 68, 220. This, in turn, enables the forward and rearward gripper fingers 48, 50, 180, 182 to open.

At such time, an axial pathway is defined along the axis 258 shown in FIG. 14 through all of the various assemblies 12, 16, 14 making up the machine 10. In other words, the forward and rearward wire-gripping devices 22, 178 and their respective gripper arms are open, as well as the thermal knife elements 128, 130. The end 19 of the wire 44 is fed into the machine until it contacts the plunger 242 within the sensor apparatus 236. At such time, a triggering signal is generated, as shown at 260 in FIG. 20.

The trigger signal causes power to be supplied to the thermal knife elements 128, 130 via heating elements or electrodes 116, 118. It also causes the gripping devices and their gripper fingers to close in the following sequence: First, the gripper fingers 48, 50, 180, 182 are closed by extending cylinders 72, 214 (see FIGS. 3 and 4). This causes the gripper fingers to center the wire relative to the forward and rearward gripping devices 22, 178. Then, the pneumatic cylinders 30, 32 in the gripping devices are activated causing their respective pressure feet 42a, 42b to close upon the wire 44, thus holding it tightly. This operation is indicated at 262 in FIG. 20. In such FIG., the line "closed finger 1 then gripper 1" means closed gripper fingers 48, 50 ("finger 1") and forward gripping device 22 ("gripper 1"). Likewise, the line "closed finger 2 than gripper 2" means closed gripper fingers 180, 182 and gripping device 188, respectively. The same terminology is used in other portions of FIGS. 20 and 21, and should be understood as indicating the same parts.

In preferred form, the machine 10 should be preset to handle the most conventional length of jacket to be stripped from the wire 44. For example, as shown at 264 in FIG. 20, the most common length would probably be 1.75 inches. However, in certain situations, it may be desirable to strip greater lengths. In such case, the forward gripping device 22 and its associated gripper fingers 48, 50 are opened, as indicated at 266. This is followed by activating stepper motor 252, thereby causing the rearward assembly 16 to move a certain distance aft, thus pulling additional wire through the forward gripping and knife hub assemblies 12, 14. Then, the forward gripping device 22 and fingers 48, 50 are once again closed, thereby holding the wire 44 firmly.

Referring now to block 268 in FIG. 20, before the knife hub 82 is rotated, the end 19 of the wire 44 is first placed into tension. This is accomplished by activating stepper motor 252 after the wire has been positioned in the machine and is firmly held by both the forward and rearward clamping devices 22, 178. The motor then moves the tension frame 188 in the aft direction, from the position shown in FIG. 10, to the position shown in FIG. 9. As the wire tension frame 188 moves aft, the horizontal slider table 186 stays nearly stationary, because the rear gripping device 178 is clamped into the wire 44. The relative movement between the two components 186, 188 is permitted because of the sliding connection provided by side bearing assemblies 190, 192. Such movement causes the slider table 186 to eventually contact the forward limiter switch 208. At such time, the stepper motor 252 is stopped, and the end of the wire is held in tension as a result of the tension created in spring 212. Then, the vertical actuators 164, 166 on the knife hub assembly 14 are retracted, thereby enabling the knife elements to close upon the wire 44, as indicated at 270.

Referring to FIG. 21, and as is indicated at 272, depending on the type of outer jacket, the microprocessor will cause the hub drive motor 88 to rotate one or more times. The number of cycles, as shown at 274, will depend on the material type initially selected by the user at the beginning of the stripping operation 254.

After the knife elements 128, 130 are rotated, power is deactivated to heating elements 116, 118, and the knife elements are retracted. This, of course, involves returning the knife hub 82 to the "home" position so that actuators 164, 166 may once again be extended. Such operation is indicated at block 276.

The cut slug is pulled from the wire 44 by following the function set forth at 278 and 280 in FIG. 21. First, the forward gripping device and gripper fingers 22, 48, 50 are opened. Then, stepper motor 252 is operated to pull approximately 1.31 inches of additional wire into the machine. This is followed by closing gripping device and fingers 22, 48, 50. Then, the rearward gripping device 178 and rearward gripper fingers 180, 182 are opened. This causes the spring 212 interconnecting the slider table 186 and tension frame 188 to pull the slider table 186 aft relative to the tension frame. The end of the slider table 186 contacts the aft limiter switch 206 as shown in FIG. 10. Then, the stepper motor 252 is activated to move the tension frame 188 forwardly while keeping the rearward gripping device and fingers 178, 180, 182 open. This repositions the pressure feet 42a, 42b of the rearward gripping device 178 nearer the place where the jacket was cut by the knife elements. The gripping device and fingers 178, 180, 182 are closed and the forward gripping device and fingers 22, 48, 50 are also closed. This is followed by activating the stepper motor 252 to once again pull the tension frame 188 aft which, in turn, pulls the rear gripping device 178 aft, and pulls the slug off the end of the wire.

Thereafter, the rearward gripper 178 and fingers 180, 182 are opened, as shown at 282, and pneumatic air may be used to blow the slug out of the rearward gripping device 178, as indicated at 284. This is followed by opening the forward device and gripper fingers 22, 48, 50, as shown at 286, and removing the stripped wire. The next wire is stripped by following the same sequence.

The preceding description sets forth the preferred embodiment of the invention as it is presently known and understood. It is anticipated that many changes could be made to the wire stripping machine as described above without departing from what is considered to be the spirit and scope of the invention. Therefore, the invention should not be regarded as being limited to the preceding description, but rather, is limited by the patent claim or claims which follow. Such claims are, of course, to be interpreted in accordance with the well-established legal guidelines for claim interpretation.

What is claimed is:

1. A machine for automatically stripping the covering from an end region of a wire, comprising:
   a base portion;
   a forward wire-gripping assembly mounted to said base portion, said assembly including a forward wire-gripping device for gripping an interior portion of said wire, said forward wire-gripping device being operable to hold said wire in fixed position while said wire end region is being stripped;
   a rearward insulation-pulling assembly mounted to said base portion, said rearward assembly including a rearward wire-gripping device operable to releasably grip said wire end region, said rearward wire-gripping device being axially moveable back and forth in a direction that is generally endwise and parallel to the position of said wire when said wire is in the grip of said forward wire-gripping device, and a drive motor mounted to said base portion, said drive motor being drivingly linked to said rearward wire-gripping device for moving said rearward device back and forth; and
   a knife hub rotatably mounted to said base portion and positioned between said forward and rearward assemblies, said knife hub carrying a pair of opposing thermal knife elements for severing said covering from said end region, and at least one spring element connected to said knife elements, wherein said at least one spring element is biased to normally close said knife elements together, said knife hub further carrying at least one actuator element that is operable to oppose the bias of said at least one spring element, and thereby open said knife elements relative to each other.

2. The wire stripping machine of claim 1, including a pair of slider members carried by said knife hub, each slider member having a central portion and oppositely-extending flange portions projecting laterally outwardly from said central portion, said slider members being moveable toward and away from each other, with the central portion of each slider member carrying one of said knife elements, and further, said at least one spring element comprises a pair of springs interconnecting said flange portions of each slider member and said knife hub, said springs being biased to normally pull said slider members toward each other.

3. The wire stripping machine of claim 2, wherein said at least one actuator element comprises a pair of elongated actuator arms carried by said knife hub, each actuator arm having both an inner and outer end, said inner end of each arm being connected to one of said slider members, for driving such slider member outwardly against the bias of said springs, said actuator arms being positioned parallel to and side-by-side each other, so that their outer ends extend outwardly relative to said knife hub in opposite directions, and a pair of opposing fluid-powered actuators spaced apart from said knife hub on generally opposite sides of said knife hub, one fluid-powered actuator being positioned adjacent said outer end of each actuator arm when said knife hub is in a certain home rotational position, each fluid-powered actuator having a reciprocating drive arm that is extendible into driving contact with said adjacent outer end when said hub is in said home position, in a manner so as to push said actuator arm associated with such end inwardly against the bias of said springs, and in operation, said hub is rotated to said home position, and said drive arms of said fluid-powered actuators then simultaneously extend and drive said actuator arms inwardly, thereby forcing said slider members apart to define a pathway between said thermal knife elements, for extending said wire end region therethrough.

4. The wire stripping machine of claim 3, including a reversible hub drive motor mounted to said base portion, said knife hub carrying a circular drive sprocket member, and a drive belt interconnecting said hub drive motor and said drive sprocket member for driving said knife hub in rotation.

5. The wire stripping machine of claim 1, wherein said forward wire-gripping device of said forward wire-gripping assembly includes a pair of reciprocatable air cylinders, each cylinder having a pressure foot that is extendible and retractable relative to said cylinder, said cylinders being axially aligned in spaced relationship relative to each other in a manner so that said pressure feet move directly toward and close together when said cylinders are simultaneously extended, for gripping said interior portion of said wire between said pressure feet, said pressure feet defining a pathway leading to said knife hub when said pressure feet are retracted.

6. The wire stripping machine of claim 5, wherein each pressure foot includes a wire-contacting surface that is roughened.

7. The wire stripping machine of claim 5, wherein each pressure foot includes a removable rubber gripping surface.

8. The wire stripping machine of olaim 5, wherein said forward wire-gripping device of said forward wire-gripping assembly further includes a pair of spreadable gripper fingers positioned immediately forward of said cylinders, for centering said wire relative to said pressure feet of said forward wire-gripping device.

9. The wire stripping machine of claim 8, wherein said cylinders are positioned above a pedestal, said pedestal being positioned forwardly of said knife hub, and wherein said spreadable gripper fingers are pivotably mounted to a forward side of said pedestal, and including means for spreading said gripper fingers, for enabling said wire end region to be fed between said fingers and in between said pressure feet, and for thereafter closing said fingers to center said wire relative to said pressure feet.

10. The wire stripping machine of claim 1, wherein said rearward insulation-pulling assembly further comprises a wire tension frame, said wire tension frame carrying a horizontally movable slider table, and a tensioning spring interconnecting said wire tension frame and said slider table, said tensioning spring being biased to normally pull said slider table rearwardly away from said knife hub, said slider table otherwise being free to move between opposite ends of a limited range of travel relative to said wire tension frame, said wire tension frame being drivingly connected to said drive motor, and further, said rearward wire-gripping device is mounted to said slider table.

11. The wire stripping machine of claim 10, including forward and rearward limiting switches positioned adjacent opposite ends of said slider table, for providing electrical signals as to when said slider table has traveled to one or the other ends of said limited range of travel.

12. The wire stripping machine of claim 10, wherein said rearward wire-gripping device of said rearward insulation-pulling assembly includes a pair of reciprocatable air cylinders, said cylinders being mounted on top of a rearward pedestal, said rearward pedestal being mounted to said slider table, each cylinder having a pressure foot that is extendible and retractable relative to said cylinder, said cylinders being axially aligned in spaced relationship relative to each other in a manner so that said pressure feet move directly toward each other when said cylinders are simultaneously extended, and thereby come together for gripping said end region of said wire between said pressure feet.

13. The wire stripping machine of claim 12, including a tubular sensor positioned aft of said rearward wire-gripping device, said sensor including means for determining the end position of said end region of said wire relative to said thermal knife elements of said knife hub.

14. The wire stripping machine of claim 13, wherein said tubular sensor has a forward end fixedly connected to said rearward wire-gripping device, and a vertical sensor support member mounted to said base position, said sensor support member extending vertically upward from said slider table, said sensor support member supporting said tubular sensor generally horizontally aft of said rearward wire-gripping device.

15. The wire stripping machine of claim 12, wherein each pressure foot includes a wire-contacting surface that is roughened.

16. The wire stripping machine of claim 12, wherein each pressure foot includes a removable rubber gripping surface.

17. The wire stripping machine of claim 12, wherein said rearward wire-gripping device of said rearward insulation-pulling assembly further includes a pair of spreadable gripper fingers positioned immediately forward of said cylinders, for centering said wire relative to said rearward wire-gripping device, said fingers being pivotally mounted to said rearward pedestal, and including means for spreading said gripper fingers, for centering said wire relative to said pressure feet.

* * * * *

UNITED STATES PATENT AND TRADEMARK OFFICE
CERTIFICATE OF CORRECTION

PATENT NO. : 5,320,002
DATED : June 14, 1994
INVENTOR(S) : Babak Sayyadi and Howard J. Van Laeken It is certified that error appears in the above-identified patent and that said Letters Patent is hereby corrected as shown below:

Column 2, line 3, there is no paragraph break after "cables".

Claim 8, column 15, line 51, "olaim" should be -- claim --.

Claim 14, column 16, line 44, "position" should be -- portion --

Signed and Sealed this

Twentieth Day of December, 1994

Attest:

BRUCE LEHMAN

*Attesting Officer*   *Commissioner of Patents and Trademarks*